Feb. 5, 1952     W. F. RICHARDS     2,584,616
THERMOCOUPLE DEVICE
Filed June 29, 1950
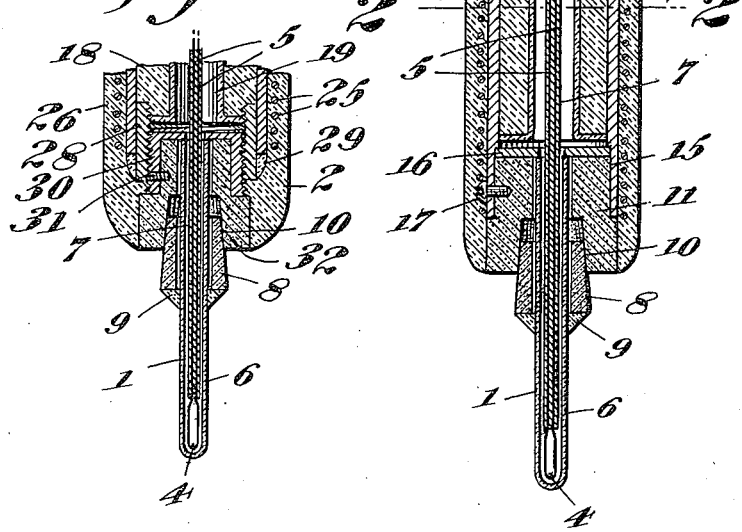
Inventor
Ward F. Richards.
By R. S. C. Dougherty
Attorney Patented Feb. 5, 1952

2,584,616

UNITED STATES PATENT OFFICE 2,584,616

THERMOCOUPLE DEVICE

Ward F. Richards, Bethlehem, Pa., assignor to Bethlehem Steel Company, a corporation of Pennsylvania Application June 29, 1950, Serial No. 171,123

2 Claims. (Cl. 136—4)

My invention relates to a pyrometric thermocouple device for ascertaining the temperatures of molten metal baths, and is a continuation-in-part of my copending application, Serial No. 82,039, filed March 18, 1949, for Thermocouple Device.

It is generally recognized that the most accurate type of device available for measuring the temperature of liquid steel baths in open hearth and electric arc furnaces is, when properly used, the immersion thermocouple. This type of device depends for its operation upon the very small electric current generated by the application of heat to the hot junction between wires of dissimilar metals or alloys. The thermocouple wires best able to resist high temperatures, preferably platinum and a platinum-rhodium or platinum-iridium alloy, are quite expensive, and therefore should be short. The greater the temperature differential between the hot junction and the cold junction forming the terminals of these thermoelements, however, the greater will be the amount of electrical energy generated.

One object of my invention, therefore, is to provide a high temperature thermocouple device which is adapted for taking either direct or indirect temperature measurements of molten metals.

Another object is to provide a high temperature thermocouple device utilizing short lengths of thermoelement wires and having ample inner protection in the cold junction housing assembly to maintain a relatively low and substantially constant temperature therein during the temperature measurement period.

A further object is to provide a high temperature thermocouple device which is relatively inexpensive and simple in construction, while permitting easy replacement of expendable parts.

Still other objects, purposes and advantages of my invention will appear hereinafter in the specification and in the appended claims.

In order to have my invention more distinctly understood, I shall now refer to the sheet of drawings hereto annexed, in which like characters of reference designate like parts:

Figure 1 is a side elevation of my invention arranged for use as a direct immersion thermocouple device;

Fig. 2 is a horizontal section of the device, taken on the line 2—2 of Fig. 3;

Fig. 3 is a vertical section of the device; and

Fig. 4 is a broken vertical section of a tip modification.

Referring now to Figs. 1 to 3 inclusive of the drawings, the device comprises three readily separable elements, namely, the immersion tip 1, the cold junction housing 2, and the long manipulating pipe 3.

The immersion tip 1 includes the welded hot junction 4 of the short 6-inch to 7-inch thermoelement wires 5 of a platinum/platinum 10% rhodium thermocouple, which is protected by a terminally closed thin-walled quartz or satin finish silica tube 6 and provided with an inner double-hole insulator 7 which centers and supports the upper portion of thermo-element wires 5. The rear portion of the silica tube 6 is cemented in place in the externally tapered graphite plug 8 by a suitable air-setting refractory cement 9, for example "Sairset" cement, which is composed of clay diaspore with sodium silicate as a binder. In turn, the graphite plug 8 is adapted to be inserted into the correspondingly inwardly tapered recessed portion 10 of the graphite sleeve 11.

The brazed cold junctions 12 between the thermo-element wires 5 and the compensating lead wires 13 are enclosed within the protective housing 2, which comprises a suitable length of steel pipe 14 having on its lower end an inner recessed portion 15 adapted to receive the metal washer 16 and the graphite sleeve 11, held by setscrew 17, said housing being provided with an inner lining 18 of a refractory cement such as "Sairset," having a smooth inner surface coating 19 of porcelain cement.

Welded inside the upper end of the pipe 14 is a short interiorly threaded pipe sleeve 20 into which is threaded a reducer bushing 21, into which in turn is threaded one end of the long manipulating pipe 3. The other end of said pipe 3 is provided with a ring handle 22 whereon is mounted a polarity receptacle 23, which is connected to the compensating lead wires 13 extending through the insulator 24 in the pipe 3.

The housing 2 and manipulating pipe 3 are then bound around with wire 25 and covered with a coating 26 of "Sairset" cement or the like heat-resistive material, for added protection against slag attack, excessively deep immersion or hot metal splash.

Whenever a bath temperature is to be taken, the connecting plug 27 inserted in receptacle 23 connects the device through an extension lead wire (not shown) to a fast reading millivoltmeter (also not shown) properly calibrated as a pyrometer of the desired scale. Using, for example, a standard Leeds and Northrup electronic pyrometer, approximately twenty seconds immersion in the liquid bath is all that is required to record a temperature.

In the tip modification shown in Fig. 4, a short interiorly threaded pipe sleeve 28 is welded as at 29 inside the lower end of the pipe 14. Threaded into said pipe sleeve 28 is a complementary metal fitting or retainer 30 in which there is fastened by means of a setscrew 31 a graphite sleeve 32 adapted for receiving the graphite plug 8 as in the other form of the device.

With either type of immersion end, the ease of removal of the graphite plug 8 holding the silica tube 6 makes inspection or repair of the thermocouple hot junction 4 or substitution of a new silica tube 6 a very quick and simple operation.

The device with either form of tip is sufficiently light in weight to be handled with slight effort by one man. The short length of the thermo-elements renders it inexpensive to construct. While the cold junctions are therefore close to the hot end of the assembly, and their housing may in fact be immersed under the surface of the bath, the housing is so well insulated against heat that there is virtually no temperature rise at the cold junctions during a normal bath temperature measurement. Although the temperature at the cold junctions may rise to about 400° F. after the thermocouple has been removed from the furnace and the retained heat of the refractory coated pipe soaks through to the junction, after the assembly has cooled again to room temperature and has been inspected and if necessary a new silica tube has been installed, it is then ready for another immersion.

Although I have described my invention hereinabove in considerable detail, I do not wish to be limited strictly to the exact and specific details disclosed but I may also use such modifications, substitutions or equivalents thereof as are included within the scope and spirit of the invention, or pointed out in the appended claims.

I claim:

1. A device for measuring temperatures of molten metal comprising a thermocouple having cold and hot junctions, a cold junction housing comprising a tubular metal casing having on its lower end an inner annularly recessed portion, an adherent coating of heat resistant material applied internally and externally to said casing, a refractory block fastened within said annularly recessed portion, and a removable refractory plug therein holding a protective tip enclosing the hot junction.

2. A device for measuring temperatures of molten metal comprising thermocouple wires having cold and hot junctions, a cold junction housing bound with wire and thermally insulated with refractory cement, a pair of annular metal members concentrically secured within the lower portion of said housing, a refractory block with a vertical bore and having its upper portion attached within said annular members, and a refractory plug inserted into said vertical bore and holding a protective tip enclosing the hot junction and adapted for ready removal of the plug and tip.

WARD F. RICHARDS.

REFERENCES CITED

The following references are of record in the file of this patent:

UNITED STATES PATENTS

| Number | Name | Date |
| --- | --- | --- |
| 1,367,026 | Drinker | Feb. 1, 1921 |
| 2,019,695 | Ross | Nov. 5, 1935 |
| 2,054,120 | De Florez | Sept. 15, 1936 |
| 2,463,427 | Richards | Mar. 1, 1949 |

OTHER REFERENCES

Weitzenkorn, Electric Furnace Steel, Proc. 2nd Conf. A. S. M. E. (1944), pages 146 and 147.

Winkler, Blast Furnace and Steel Plant, May, 1949, pages 536–538.